United States Patent [19]
Bruni et al.

[11] Patent Number: 5,327,065
[45] Date of Patent: Jul. 5, 1994

[54] HAND-HELD INDUCTIVE CHARGER HAVING CONCENTRIC WINDINGS

[75] Inventors: Michael F. Bruni, Hermosa Beach; Gerald A. Cox, Playa Del Rey, both of Calif.

[73] Assignee: Hughes Aircraft Company, Los Angeles, Calif.

[21] Appl. No.: 823,949

[22] Filed: Jan. 22, 1992

[51] Int. Cl.$^5$ .............................................. H02J 7/00
[52] U.S. Cl. ................................. 320/2; 336/DIG. 2
[58] Field of Search ................. 320/2, 39; 336/DIG. 2

[56] References Cited

U.S. PATENT DOCUMENTS

| | | | |
|---|---|---|---|
| 3,105,929 | 10/1963 | Blue | 320/2 |
| 3,641,336 | 2/1972 | Boin | 320/2 X |
| 3,867,950 | 2/1975 | Fischell | 128/419 P |
| 3,885,211 | 5/1975 | Gutai | 320/2 |
| 3,996,543 | 12/1976 | Conner et al. | 336/58 |
| 4,031,449 | 6/1977 | Trombly | 320/2 |
| 4,397,055 | 8/1983 | Cuchiara | 320/2 X |
| 4,656,412 | 4/1987 | McLyman | 320/39 |
| 5,264,776 | 11/1993 | Hulsey | 320/2 |

Primary Examiner—R. J. Hickey
Attorney, Agent, or Firm—L. A. Alkov; W. K. Denson-Low

[57] ABSTRACT

A hand-held inductive charger having concentric windings for transferring electrical power across a dielectric medium using magnetic induction. The charger comprises a removable primary coil assembly having a housing with a primary core disposed therein, and a primary winding protruding from the primary core. An electrical cable coupled to the primary winding that is adapted to couple power thereto from a power source. A secondary coil assembly having a receptacle housing is also provided, and a secondary core is disposed in the receptacle housing, and first and second concentric secondary windings are disposed in the secondary core. The first and second concentric secondary windings are coupled to a battery of an automobile. The first and second concentric secondary windings have a gap therebetween that is adapted to receive the primary winding therein. The primary and secondary coil assemblies form a transformer when their respective windings are mated. The charger allows an electric vehicle to be charged safely without any type of conventional electrical plug. The charger thus provides a safe, convenient and weatherproof mechanism for coupling power from a voltage source to an electric vehicle to recharge its propulsion battery. Approximately 6000 watts has been transferred through an embodiment of the charger having a volume of 25.8 cubic inches, yielding a power density of 230 Watts/cubic inch.

8 Claims, 2 Drawing Sheets

HAND-HELD INDUCTIVE CHARGER HAVING CONCENTRIC WINDINGS

BACKGROUND

The present invention relates to inductive chargers, and more particularly to a hand-held inductive charger that is adapted for use with electric automobile propulsion battery charging systems, and the like.

With the development of electric powered automobiles and the push towards their production for relatively widespread consumer use within the next ten years, there is a need for a means to easily charge the propulsion batteries contained therein. Conventional battery charging devices are not well suited for this purpose. In particular, conventional battery chargers are not designed for frequent use by consumers, and it is not easy to charge batteries on a regular basis using conventional chargers.

Consequently, it is an objective of the present invention to provide for a hand-held inductive charger that is adapted for use in an automobile propulsion battery charging device, or the like, that is simple to use and is adapted to efficiently charge an automobile propulsion battery employed in an electrically powered automobile.

SUMMARY OF THE INVENTION

In order to meet the above and other objectives, the present invention provides for a hand-held inductive charger that provides a means for transferring electrical power across a dielectric medium using magnetic induction. More specifically, the hand-held inductive charger comprises a hand-held removable primary coil assembly, and a secondary coil assembly that is disposed in a vehicle.

The hand-held inductive charger comprises a removable primary coil assembly having a cylindrical weatherproof housing. A cylindrical primary core is disposed in the housing, and a circular primary winding protrudes from the cylindrical primary core. An electrical cable is coupled to the primary winding that is adapted to couple power thereto from an external power source.

The secondary coil assembly includes a receptacle housing, a cylindrical secondary core is disposed in the receptacle housing, and first and second concentric circular secondary windings are disposed in the secondary core. The first and second concentric circular secondary windings are couplable to a battery. The first and second concentric circular secondary windings have a gap therebetween that is adapted to receive the circular primary winding therein. The primary and secondary coil assemblies form a transformer when the respective primary and secondary windings are mated.

The purpose of the concentric hand-held inductive charger of the present invention is to allow an operator of an electric vehicle to charge its propulsion battery, for example. The advantage of the concentric hand-held inductive charger is in allowing an electric vehicle to be charged safely without any type of conventional electrical plug. The concentric hand-held inductive charger of the present invention thus provides a safe, convenient and weatherproof means for coupling power from a voltage source to an electric vehicle to recharge its propulsion battery.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
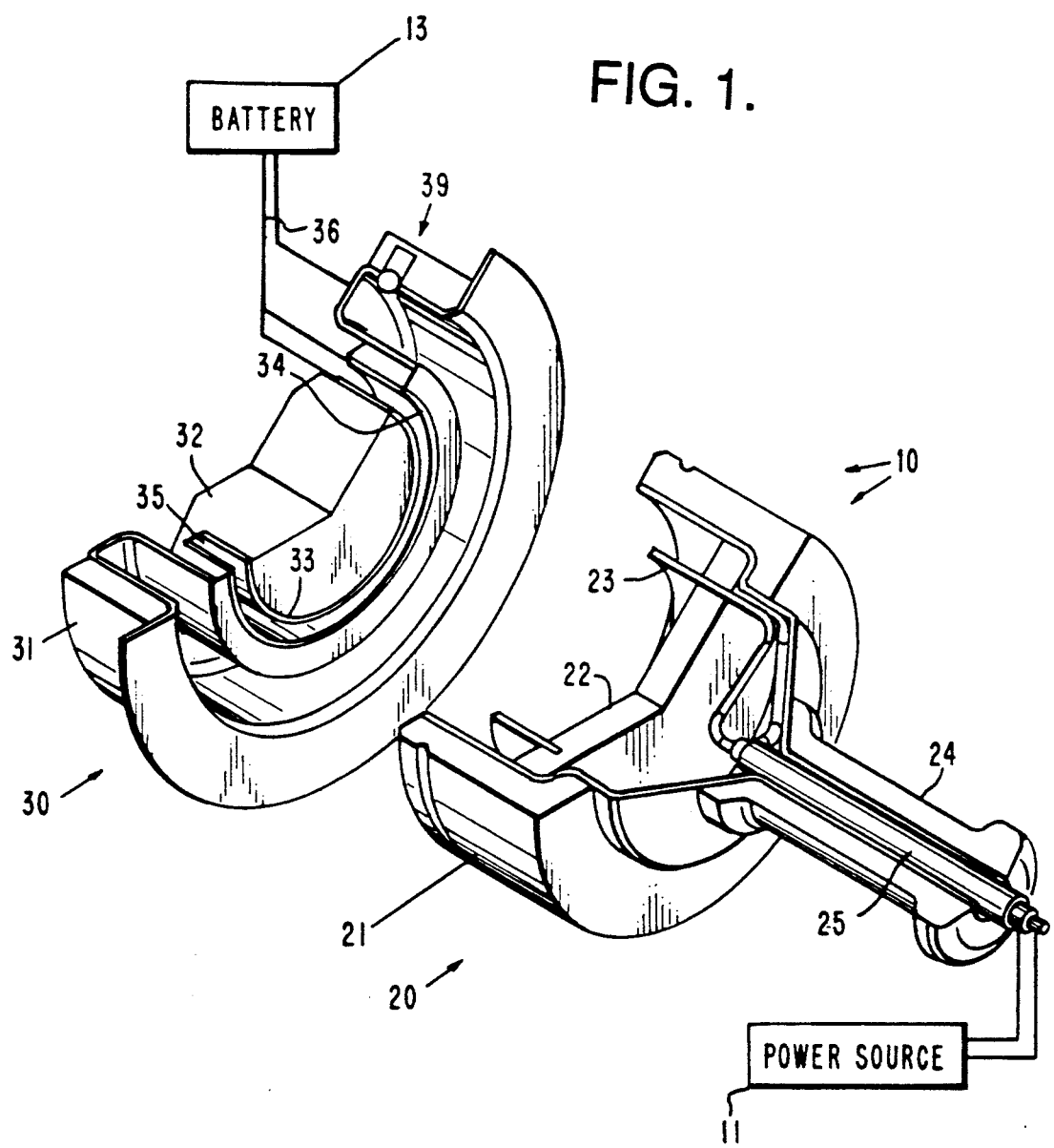
FIG. 1 shows a perspective view of a concentric hand-held inductive charger in accordance with the principles of the present invention.
Figure 2:
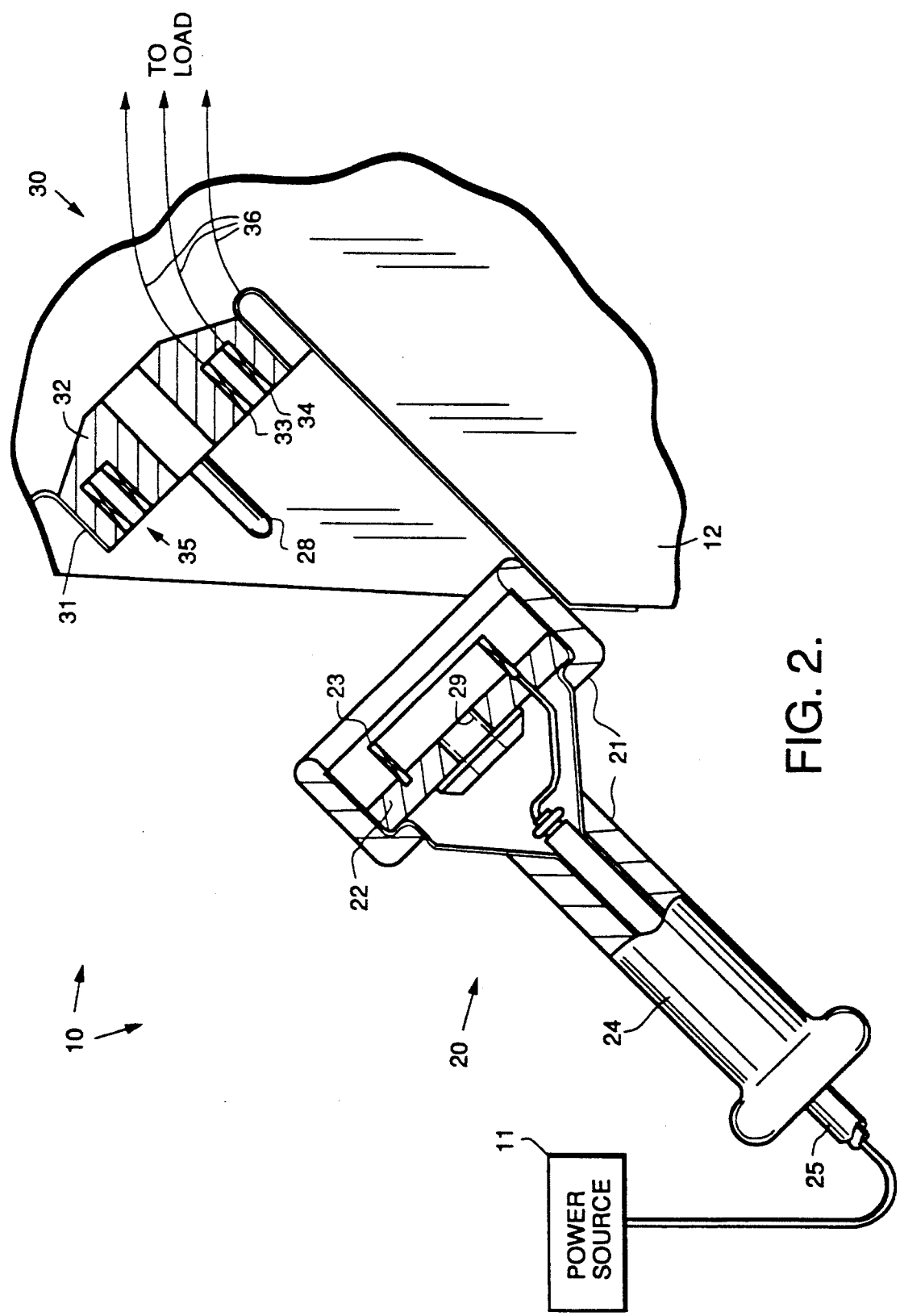
FIG. 2 shows a cross sectional view of the concentric hand-held inductive charger of FIG. 1.

Referring to the drawing figures, FIG. 1 shows a perspective view of a hand-held inductive charger 10 having concentric windings in accordance with the principles of the present invention. FIG. 2 shows a cross sectional view of the hand-held inductive charger 10 of FIG. 1 and its relationship to an electric vehicle 12 whose propulsion battery is to be charged. The hand-held inductive charger 10 is adapted to provide a safe, convenient and weatherproof means for coupling power from a high frequency power source 11, such as power converter driven by a utility line, for example, to a vehicle 12 (a portion of which is shown) in order to recharge a battery 13 disposed in the vehicle 12. The battery 13 that is charged is used to propel the vehicle 12.

The hand-held inductive charger 10 comprises a removable primary coil assembly 20 having a cylindrical weatherproof housing 21. The housing may be formed of phenolic plastic, for example. A cylindrical primary core 22 is disposed in the housing 21, and a circular primary winding 23 is disposed in and protrudes from the cylindrical primary core 22. A portion of the housing 21 forms a handle 24. A coaxial electrical cable 25, or other low inductance transmission line, is coupled to the primary winding 23 and adapted to couple power thereto from the external power source 11.

The hand-held inductive charger 10 also comprises a secondary coil assembly 30 having a receptacle housing 31. A cylindrical secondary core 32 is disposed in the receptacle housing 31. First and second concentric circular secondary windings 33, 34 are disposed in the secondary core 32. A retaining ring and groove arrangement 39 (FIG. 1) is employed to secure the secondary core 32 and secondary windings 33, 34 in the receptacle housing 31. The first and second circular concentric secondary windings 33, 34 are coupled to the battery 13 by way of electrical conductors 36. The first and second concentric circular secondary windings 33, 34 have a gap 35 therebetween that is adapted to receive the circular primary winding 23 therein. The primary and secondary coil assemblies 20, 30 form a transformer when the respective primary and secondary windings 23, 33, 34 are mated.

Ferrite material, for example, may be used for the primary and secondary cores 22, 32. Copper, for example, may be used for the primary and secondary windings 33, 34. The respective housings 21, 31 may be made of nylon or rubber, for example.

With reference to FIG. 2, the internal details of the hand-held inductive charger 10 are shown. In addition to the components shown in FIG. 1, an alignment pin 28 is shown that is adapted to mate with an opening 29 in the secondary coil assembly 20. The alignment pin 28 may be made of an epoxy-glass composition, for example.

It should be clear from FIGS. 1 and 2 that when the primary and secondary coil assemblies 20, 30 are mated, the hand-held inductive charger 10 provides for a transformer mechanism that is relatively compact and provides an efficient means for coupling energy from the power source 11 to the battery 13.

In operation, an operator holds the handle 24 of the protective weatherproof housing 21 of the primary coil assembly 20 and inserts it into the receptacle formed by the secondary coil assembly 30. The primary winding 23 is energized with electrical current from the power source 11. This causes the primary core 22 and secondary core 32 to couple magnetically thus causing current to flow in the secondary windings 33, 34. Current flowing in the secondary windings 33, 34 is rectified 37 and filtered 38 and coupled to the battery 13 of the electric vehicle 12 to charge it via the conductor 36.

A proof-of-concept prototype of the hand-held inductive charger 10 having concentric windings of the present invention was constructed and tested. The hand-held inductive charger 10 was driven by a power source 11 that comprised a conventional power electronic converter that supplied a 40 kHz quasi-square wave current thereto. Approximately 6000 watts has been transferred through an embodiment of the hand-held inductive charger 10 having a volume of 25.8 cubic inches, yielding a power density of 230 Watts/cubic inch. Precise efficiency data was not available, but the power conversion efficiency was approximately 98%.

Thus there has been described new and improved hand-held inductive charger having concentric windings that is adapted for use with electric automobile propulsion battery charging systems, and the like. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. An inductive charger comprising:
 a removable primary coil assembly comprising a housing, a primary core disposed in the housing, a primary winding protruding from the primary core, and an electrical cable coupled to the primary winding that is adapted to couple power thereto from an external power source; and
 a secondary coil assembly comprising a receptacle housing that is matable with the removable primary coil assembly, a secondary core disposed in the receptacle housing, first and second concentric secondary windings disposed in the secondary core that are couplable to a battery and wherein the first and second concentric secondary windings have a gap therebetween that is adapted to receive the primary winding therein;
 wherein the primary and secondary coil assemblies form a transformer when the respective primary and secondary windings and primary and secondary coil assemblies are mated.

2. The inductive charger of claim 1 wherein the primary and secondary cores are comprised of ferrite material.

3. The inductive charger of claim 1 wherein the primary and secondary windings are comprised of copper.

4. A hand-held inductive charger comprising:
 a removable primary coil assembly comprising a cylindrical housing having a handle portion, a cylindrical primary core comprising ferrite material disposed in the housing, a circular primary winding protruding from the cylindrical primary core, and an electrical cable coupled to the primary winding that is adapted to couple power thereto from an external power source; and
 a secondary coil assembly comprising a receptacle housing, a cylindrical secondary core comprising ferrite material disposed in the receptacle housing, first and second concentric circular secondary windings disposed in the secondary core that are couplable to a battery and wherein the first and second concentric circular secondary windings have a gap therebetween that is adapted to receive the circular primary winding therein;
 wherein the primary and secondary coil assemblies form a transformer when the respective primary and secondary windings and primary and secondary coil assemblies are mated.

5. The hand-held inductive charger of claim 4 wherein the primary and secondary windings are comprised of copper.

6. A hand-held inductive charger comprising:
 a removable first coil assembly comprising a housing having a handle portion, a first core disposed in the housing, a first winding protruding from the primary core, and an electrical cable coupled to the first winding that is adapted to couple power thereto from a power source; and
 a second coil assembly comprising a receptacle housing, a second core disposed in the receptacle housing, first and second concentric second windings disposed in the second core that are couplable to a battery and wherein the first and second concentric second windings have a gap therebetween that is adapted to receive the first winding therein;
 wherein the first and second coil assemblies form a transformer when the respective first and second windings and first and second coil assemblies are mated.

7. The inductive charger of claim 6 wherein the first and second cores are comprised of ferrite material.

8. The inductive charger of claim 6 wherein the first and second windings are comprised of copper.

* * * * *